United States Patent
Riccardo

(10) Patent No.: US 8,863,380 B2
(45) Date of Patent: Oct. 21, 2014

(54) METHOD OF RECYCLING HERMETICALLY ENCAPSULATED ALTERNATIVE COMPRESSORS OF REFRIGERATORS OF SMALL AND MEDIUM POWER RATING AND APPARATUS FOR IMPLEMENTING THE METHOD

(75) Inventor: Chiaro Riccardo, Caluso (IT)

(73) Assignee: Albatech Swiss Technology SA, Bouveret (CH)

( * ) Notice: Subject to any disclaimer, the term of this patent is extended or adjusted under 35 U.S.C. 154(b) by 139 days.

(21) Appl. No.: 13/350,341

(22) Filed: Jan. 13, 2012

(65) Prior Publication Data

US 2012/0285014 A1    Nov. 15, 2012

(30) Foreign Application Priority Data

Jan. 17, 2011    (CH) ...................... 0082/11

(51) Int. Cl.
  *B07B 13/00*    (2006.01)
  *B09B 5/00*    (2006.01)
  *B09B 3/00*    (2006.01)

(52) U.S. Cl.
  CPC .............. *B09B 5/00* (2013.01); *B09B 3/0058* (2013.01)
  USPC ............ 29/888.021; 29/403.1; 29/403.3

(58) Field of Classification Search
  CPC . B09B 3/0058; B09B 5/00; B29L 2031/7622; F25B 45/00
  USPC ............... 29/403.1, 403.3, 888.021, 890.031; 62/77, 149
  See application file for complete search history.

(56) References Cited

U.S. PATENT DOCUMENTS

| | | | | |
|---|---|---|---|---|
| 1,502,293 | A * | 7/1924 | Danielson | 269/84 |
| 1,600,604 | A * | 9/1926 | Sorlien | 83/440.2 |
| 4,901,988 | A * | 2/1990 | Wright et al. | 269/16 |
| 5,074,477 | A * | 12/1991 | Welter et al. | 241/18 |
| 5,293,756 | A * | 3/1994 | Nelson et al. | 62/292 |
| 6,732,416 | B1 * | 5/2004 | Jacobsen et al. | 29/403.3 |
| 6,944,926 | B2 * | 9/2005 | Yotsumoto et al. | 29/403.3 |
| 2002/0153439 | A1 * | 10/2002 | Yotsumoto et al. | 241/101.76 |
| 2004/0103514 | A1 * | 6/2004 | Yotsumoto et al. | 29/426.4 |
| 2006/0200964 | A1 * | 9/2006 | Cameron et al. | 29/403.3 |
| 2007/0124906 | A1 * | 6/2007 | Jin | 29/403.1 |
| 2007/0130742 | A1 * | 6/2007 | Takagi et al. | 29/403.1 |
| 2013/0340447 | A1 * | 12/2013 | Koldewey et al. | 62/77 |

FOREIGN PATENT DOCUMENTS

DE    39 11 420    10/1990
DE    40 00 172    7/1991

OTHER PUBLICATIONS

European Search Report issued in counterpart European Application EP 2 476 493.

* cited by examiner

*Primary Examiner* — Alexander P. Taousakis
(74) *Attorney, Agent, or Firm* — Greenblum & Bernstein, P.L.C.

(57) ABSTRACT

Method of recycling hermetically encapsulated alternative compressor units used in household refrigerators and an apparatus for implementing the method. The method includes precise cutting of the envelope of the compressor unit using a cutting device. After the compressor unit has been solidly mounted on a rotatable plate with its axle in vertical position, the base portion of the envelope is titled over at least 90° in such a manner that the oil emulsion and the ozone-damaging gases CFC and HCFC can be drained from the base portion, and can be collected completely and eliminated in a manner that does not damage the environment.

11 Claims, 4 Drawing Sheets

METHOD OF RECYCLING HERMETICALLY ENCAPSULATED ALTERNATIVE COMPRESSORS OF REFRIGERATORS OF SMALL AND MEDIUM POWER RATING AND APPARATUS FOR IMPLEMENTING THE METHOD

CROSS-REFERENCE TO RELATED APPLICATIONS

The present application claims priority under 35 U.S.C. §119(a) of Swiss Patent Application No. 00082/11 filed Jan. 17, 2011, the disclosure of which is expressly incorporated by reference herein in its entirety.

BACKGROUND OF THE INVENTION

1. Field of the Invention

The present invention concerns a method of recycling hermetically encapsulated alternative compressor units (piston compressors) of refrigerators of small and medium power rating and apparatus for implementing the method 2. Discussion of Background Information The problem of recycling hermetically encapsulated alternative compressor units of refrigerators of small and medium power rating, i.e. refrigerators omnipresent in every household, has become more important in recent times in view of the very large number of refrigerators being scrapped worldwide, and that in each hermetically sealed compressor unit a certain quantity of refrigerant liquid remains, which is to be eliminated most efficiently and without losses. Also recuperating the materials of which the compressor unit (Iron, cast elements, copper, alloys, etc.) consists is important and is to be effected most efficiently.

This known recycling system still presents a number of ecologic and economic disadvantages, which can be overcome in the following manner:

The compressors still contain a noticeable quantity of refrigerant oil emulsions with the ozone damaging gases CFC and HCFC.

Crushing contaminates the fragmented particles with the oil emulsion, thus causing intensified contamination in the following form:

Emission of substances affecting the climate due to the well-known greenhouse effect, Ozone damaging emissions causing the dreaded hole in the ozone layer.

Furthermore the crushing process is expensive requiring complex machinery, cost being increased further due to the necessity that the powders, or granules respectively, resulting from the various treatment phases must be precipitated and upgraded further.

Notwithstanding the fact that the present invention basically deals with systems apt to eliminate oil emulsions remaining in the compressors it is to be explained in more detail in which manner these systems, as applied today, function in order to solve said problem. Two systems are applied:

The first mentioned system aims at expelling oil emulsions from the severed small copper tubes that connect the compressor with the cooling unit; said system, however, presents the following disadvantages:

The necessity of making up, for each compressor model, mounting frames of suitable shape and dimensions, apt to maintain the compressor in the position correctly tilted for draining, The necessity of providing sealing vessels for taking up the oil emulsions, The necessity of effecting the separation of the small copper tubes without squashing them or, expressed in other words, without clogging or obstructing the draining of the oil emulsions; normally the small copper tubes are just sheared off, and the draining process is very slow and time consuming.

The elements inside still contain some oil emulsion and for complete draining various tilting operations, waiting periods and corresponding rearrangements for draining the residual liquid are required.

These operations are effected manually and are very time consuming and quite cost intensive and thus not suited for industrial operations.

The second applied system consists in opening a hole in the envelope of the compressor unit, entailing the following inconveniences:

The necessity of performing the operation manually,

The necessity of preparing mounting frames suitable for holding each compressor model for the draining process, The necessity of preparing sealing vessels for collecting the oil emulsions, The necessity of effecting successive tilting operations, waiting periods and repositioning operations ensuring complete draining of the oil emulsions still contained in the inner elements, this manual procedure being time consuming and cost intensive, and thus rather unsuitable in industrial operations.

SUMMARY OF THE EMBODIMENTS

At this point it is to be underlined, that the present invention concerns just one type of the three types of alternative compressors, subdivided into hermetically encapsulated compressors, semi-hermetically encapsulated (i.e. accessible hermetically sealed compressors) and open compressors. The two last mentioned types permit access to the inside via cover plates or screwed-on cover plates, recycling thus being facilitated in comparison to hermetically encapsulated compressors. In the following a comprehensive definition is given of the hermetically encapsulated type compressor, to which the present invention refers:

"Hermetically encapsulated Compressors form one block, including the electric motor, and are encapsulated in a sealed envelope, the inside of which is filled with steam of the refrigerant liquid. Compressors of this type typically are used in cooling systems of minimal cooling power, e.g. in household refrigerators, but applications in medium power cooling systems (of up to 10-15 kW power rating) can be found . . . ."

The advantage of the hermetically encapsulated alternative compressor compared to the other types is seen in that it is not subjected to losses of refrigerant liquid.

According to the present state of the art industrial recycling of hermetically encapsulated alternative compressor is effected in the following work phases:

Separation of the compressor unit from the refrigerator housing, the refrigerant circuit being severed and no longer containing refrigerant gas, Treatment of the compressors in suitable plants for recuperation of the metallic materials, in which the compressors are chopped in order to permit recuperation of the materials contained, which are to be transferred to specialist iron and metallurgic plants, whereupon the chopped material is crushed further to small fragments better suited for separation.

The disadvantages and inconveniences noted herein can be eliminated using the inventive method permitting recuperation of the oil emulsions still present in the compressor unit and selection of the various materials contained in the compressor unit, as described herein.

The main characteristic of the present invention consists in that the head or top portion of the compressor envelope is cut off and separated from the base portion of the envelope. Owing to this operation, novel within the frame of the present invention, the danger of irritant emissions due to the oil emulsions, the CFC and the HCFC can be avoided completely, and the metallic materials can be recuperated and selected without deterioration of their quality, considerable economic savings being achieved owing to the fact that application of special devices no longer is required for separating the various metals contained in the compressor units.

The invention thus provides for a method of recycling hermetically encapsulated alternative compressor units used in refrigerators of small and medium power rating, wherein the method comprises placing and solidly mounting a compressor unit on a rotatable plate, wherein an axis of the of the compressor unit is arranged to coincide with a rotation axis of the rotatable plate; rotating the rotatable plate and the compressor unit mounted thereon about the rotation axis of the rotatable plate, moving a cutting device toward a circumference of a head portion of an envelope of the compressor unit, cutting the head portion of the envelope of the compressor unit and separation the head portion from a base portion of the envelope, tilting of the base portion of the envelope over at least 90° and draining liquid contained in the compressor unit, recuperating the liquid contained in the compressor unit, after the envelope has been cut open, extracting a motor from the compressor unit and removing elements of the compressor unit and carrying off of the elements using a transporting belt, and selecting metals of the elements taken off and recuperating various materials forming the compressor unit.

In embodiments, the cutting device is a mechanical cutting device.

In embodiments, the cutting device is a milling tool.

In embodiments, the cutting device is a grinding disc.

In embodiments, the cutting device is a plasma burner torch.

In embodiments, the cutting device is a laser beam cutter.

In embodiments, the extracting and the removing are performed manually.

In embodiments, the extracting and the removing are performed with help of a manipulating robot.

In embodiments, the selecting and the recuperating various materials are performed manually.

In embodiments, the selecting and the recuperating various materials are performed with help of one or more identifying and manipulating robots.

The invention also provides for an apparatus for performing the method of described above, wherein the apparatus comprises a rotatable plate upon which a compressor unit can be mounted coaxially and a cutting device for cutting an envelope of the compressor unit. The cutting device is one of a milling tool, a grinding disc, a plasma burner torch, or a laser beamer. A tilting device is used for tilting, over at least 90 degrees, a base portion of the envelope when cut open. A collecting and recuperating system is used for collecting and recovering liquid contained in the compressor unit. A transporting belt is used for transporting elements taken off the compressor unit.

In embodiments, the transporting belt is permeable for the liquid and a collecting vessel is arranged to collect the liquid passing through the permeable transporting belt.

In embodiments, the apparatus further comprises one of an identifying robot for automating at least one of the tilting, the recuperating the liquid and extracting as recited above, a manipulator robot for automating at least one of the tilting, the recuperating the liquid and extracting as recited above, and an identifying and manipulator robot for automating at least one of the tilting, the recuperating the liquid and extracting as recited above.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 2:
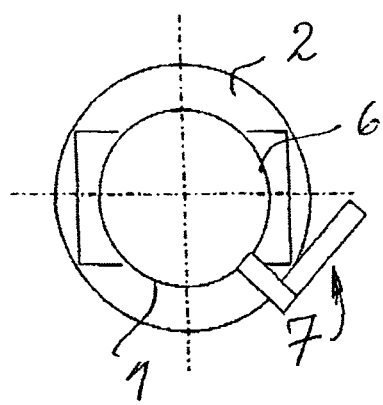
FIGS. 1 through 7 merely schematically illustrate the various steps in the procedure of the inventive method and the corresponding devices for implementing the method.
Figure 1:
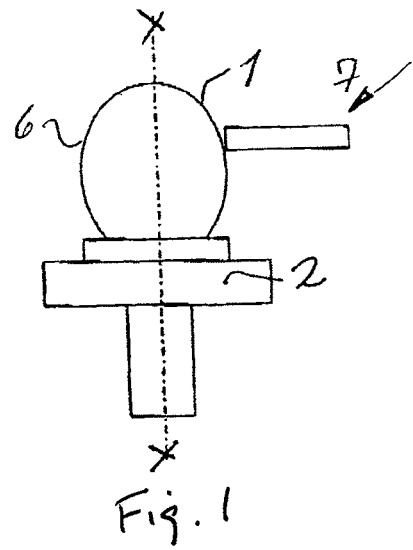

The FIGS. 1 through 4 show said devices in more detail in a top view and in a side view, namely:

In the FIG. 1 of the compressor unit 1 is mounted on a rotatable table 2 positioned in such manner that the axis of the compressor 1 coincides perfectly with the rotational axis x-x of the rotatable table 2. The rotatable table 2 of course is equipped with devices (not shown) for aligning and fixing the compressor unit 1 in such a manner that the compressor unit 1 is solidly mounted on the rotatable plate 2 and thus can rotate with it being perfectly aligned as shown in the FIG. 2. Perfect alignment of the compressor unit on the rotatable plate 2 is essential for obtaining perfect cutting off of the head portion of the compressor 1, which operation is the most delicate and important one in the whole inventive method.

The arrow f indicates the rotation of the plate 2 with the compressor unit 1, which rotation can be effected in either direction. In the FIGS. 3 and 4 the characterising operation of the present invention is shown, namely the cutting off of the head portion of the envelope of the compressor 1.

Figure 8:
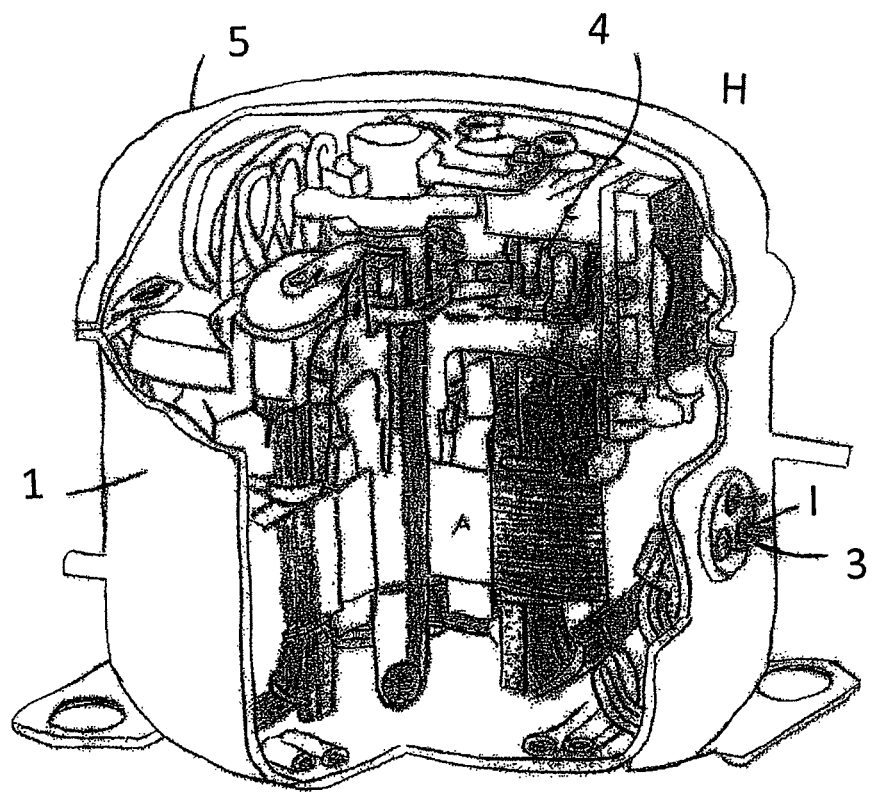
FIG. 8 depicts an exemplary view of a typical hermetically encapsulated alternative compressor as applied in practical use, for showing the great complexity of its contents and for better understanding of the problems in recycling the various components.

From the FIG. 8, which shows a design example of a hermetically encapsulated alternative compressor, it can be seen in which manner the electric motor 3 can be connected inside the envelope 1 to the alternative compressor 4 and the other devices required, which are made from various materials that are to be recycled. It also is shown in which manner the head portion 5 of the compressor unit is soldered to the lower portion of the envelope in order to seal the compressor unit in such manner that it can not be opened without cutting open the envelope. The hermetically encapsulated alternative compressor unit shown in the FIG. 8 represents, as an example merely, the layout of a unit of this type, which in its details may vary considerably depending on the manufacturer, but always contains basically the same elements. The present invention applies to all types of hermetically encapsulated alternative compressors presently known in practical use. Just the last work phase provided in the inventive procedure can vary, namely the phase of selecting the metals, which can be effected, according to the present invention and in function of a number of specific parameters (layout of the compressor, series size of compressor units to be recycled, economic feasibility of the operation, etc.), manually as well as with the help of a manipulator robot.

Figure 3:
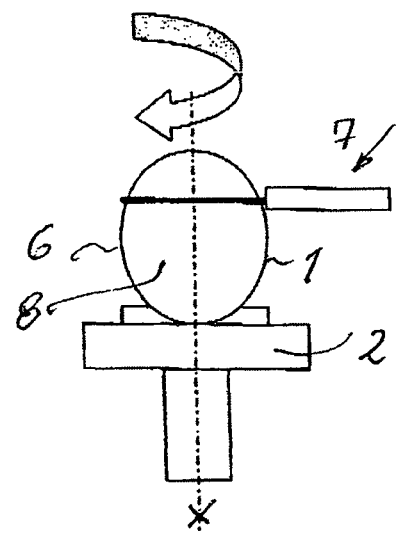

In the FIG. 3 schematically shows the phase of circumferential (namely along the circumference) closing in of a cutting device 7 to the head portion 5 of the envelope 6 of the compressor unit 1.

Figure 4:
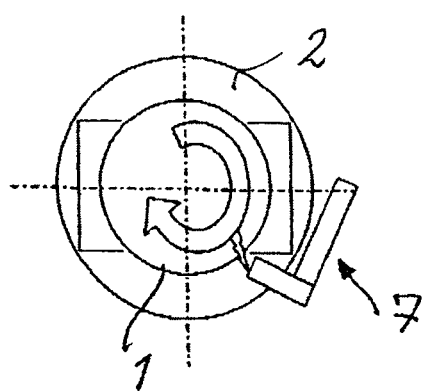

The cutting device 7 is shown very schematically in the FIGS. 3 and 4, as this device according to the present invention can assume various forms, depending on the particular conditions of realisation of the method. It can be provided according to a first preferred form of realisation and applying a simple and widely used technology, as a mechanical cutting organ in the form of a milling tool or a rotating grinding disk, but also can be provided in the form of a plasma burner torch or a laser beam cutter. The choice of the cutting system depends on various factors, such as e.g. the technology available, the size of the series of compressors to be treated, the precision of the cutting operation required—which is to be performed without damaging the devices contained in the compressor unit—, the overall economic feasibility of the operation, etc. It thus is left to the judgement of the specialist in the field to choose the type of cutting tool 7 best suited to the requirements.

Figure 5:
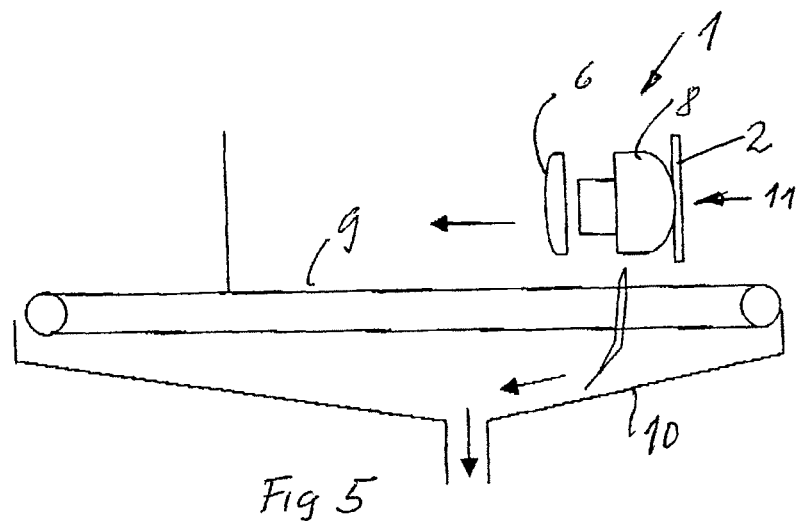
Figure 6:
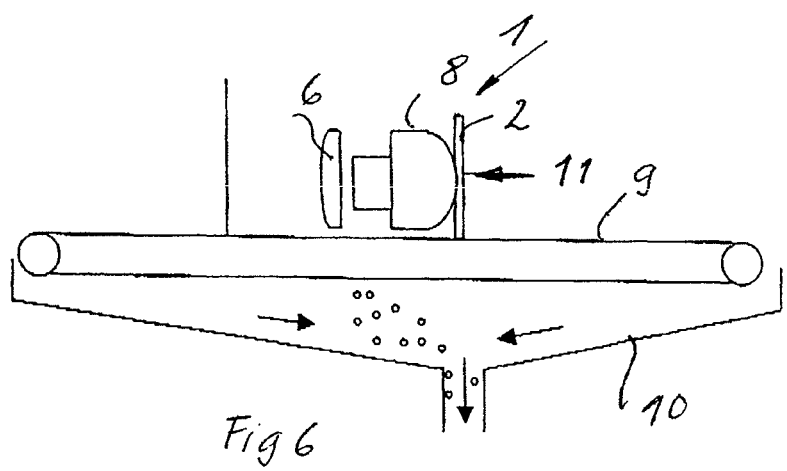

The subsequent phase in the procedure is shown, still schematically, in the FIGS. 5 and 6, in which the tilting of the base portion of the envelope 6 over at least 90° is shown and the complete draining of the liquid contained in the compressor unit 1, which liquid is collected and eliminated in any feasible manner, e.g. as provided in the claims 8 and 9 concerning a collecting device most suitable for the realisation of the inventive procedure, using a transporting belt 9 permeable for the liquid, under which a collecting vessel 10 is arranged.

The tilting device for tilting the base portion 8 as well as the device for extracting the motor 3 from the compressor unit 1 after cutting the envelope 6, and elimination of the elements taken off using a transporting belt 9, are not shown in detail in the Figures, as devices are concerned that can be realised in various ways by any specialist in the field. The operations mentioned, depending on the conditions of realisation of the inventive method, can be effected manually or more or less automatically, e.g. using a manipulating robot.

Figure 7:
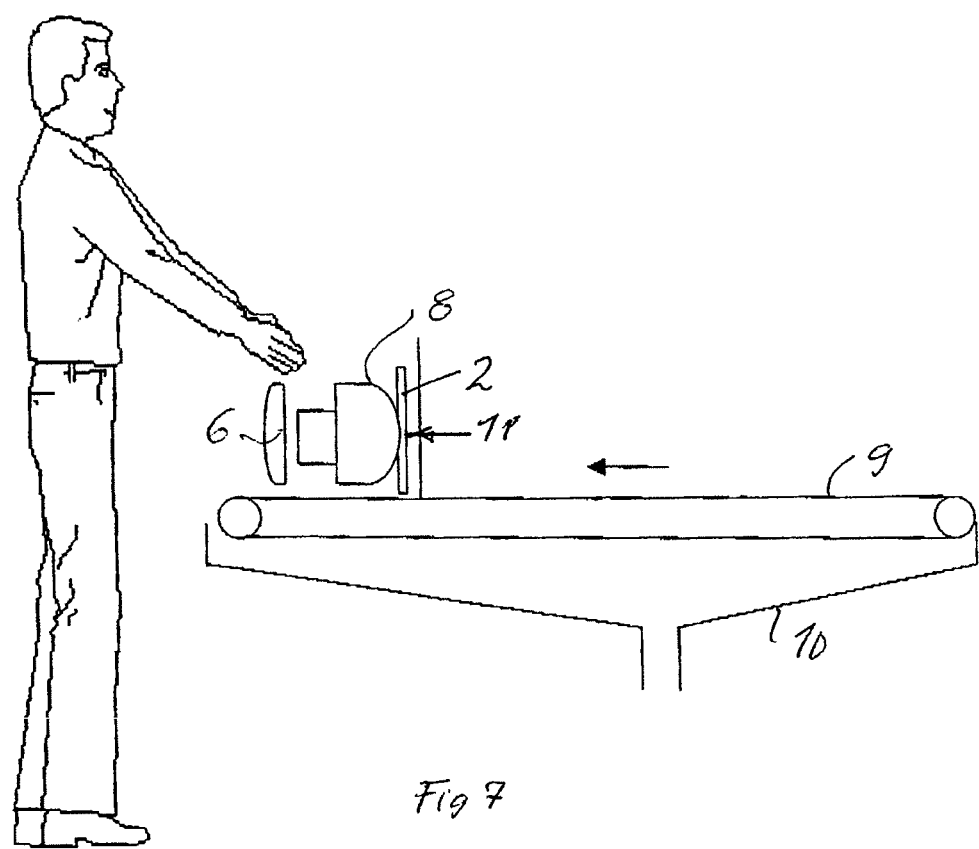

Also the last working step of the inventive method, namely the separation of the metals of the elements taken off, can be effected, as indicated in the FIG. 7, at the end of the transporting belt 9, manually by an operator or automatically using a suitable manipulating and selecting robot, depending on the conditions of realisation of the inventive method. It merely is important, however, that after the transport of the dismantled elements of the compressor unit 1, a careful separation is effected of the various materials of which the compressor unit 1 consists, which materials then are sent to plants apt to recuperate them.

Concerning the apparatus for implementing the inventive method it is evident that this must comprise a rotatable plate 2 on which the compressor unit 1 is mounted coaxially, a cutting device 7 for cutting the envelope 6, which according to the present invention can be provided in the forms as described e.g. in the method claim 2, 3, 4 or 5, and a tilting device (indicated with the reference number 11 in the FIGS. 5, 6 and 7) apt to permit tilting of the rotational axis x-x of the rotatable plate 2 over at least 90°, i.e. from the vertical position to at least a horizontal position or a position inclined down, as well as a collecting system 10 and a transporting belt 9, which transports the elements taken off and placed thereon, to a station where the materials are separated.

All these devices can, for practical applications, assume most different forms of realisation, the free choice of which is left to the specialist in the field. It just is to be noted that the system for collecting and recuperating 10 the liquid contained in the compressor unit 1, which is drained from the base portion 8 of the cut open envelope 6 when tilted over at least 90°, preferably can, according to a preferred form of realisation of the inventive apparatus, be a transporting belt 9, which is permeable to the liquid—namely e.g. provided with suitable openings—under which a collecting vessel 10 for collecting the liquid is provided. Also here other solutions can be imagined which also could be realised and thus are part of the inventive concept presented here.

In analogy to the above description, selection of the materials of the elements dismantled can be effected by hand at the end of the transporting belt 9, as shown in the FIG. 7, or more or less automatically with the help of a suitable identifying and/or manipulator robot apt to perform the operation in a more or less automatic manner.

The advantages of the inventive apparatus, based on the precise cutting off of the envelope 6 of the compressor unit 1 and on the tilting of its base portion, in addition to the fundamental advantage of complete elimination of the oil emulsion, the CFC and the HCFC contained in the compressor unit 1 taken from the refrigerator, are seen in the possibility of recuperating the materials, of which the compressor unit 1 consists, completely and in clean manner, i.e. ecologically feasible. Finally the great flexibility of applying the inventive apparatus is to be noted, which permits recycling of various types of compressor units 1 without cost intensive modifications.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF THE ELEMENTS IN THE FIGURES

1 Compressor unit
2 Rotatable plate
3 Electric motor
4 Alternative compressor

5 Head portion of the compressor
6 Envelope of the compressor
7 Cutting tool
8 Base portion of the envelope
9 Transporting belt
10 Collecting vessel
11 Tilting device

What is claimed:

1. A method of recycling hermetically encapsulated alternative compressor units used in refrigerators of small and medium power rating, the method comprising:
   placing and solidly mounting a compressor unit on a rotatable plate, wherein an axis of the of the compressor unit is arranged to coincide with a rotation axis of the rotatable plate; rotating the rotatable plate and the compressor unit mounted thereon about the rotation axis of the rotatable plate;
   moving a cutting device toward a circumference of a head portion of an envelope of the compressor unit;
   cutting the head portion of the envelope of the compressor unit and separation the head portion from a base portion of the envelope;
   tilting of the base portion of the envelope over at least 90° and draining liquid contained in the compressor unit;
   recuperating the liquid contained in the compressor unit;
   after the envelope has been cut open, extracting a motor from the compressor unit and removing elements of the compressor unit and carrying off of the elements using a transporting belt; and
   selecting metals of the elements taken off and recuperating various materials forming the compressor unit.

2. The method of claim 1, wherein the cutting device is a mechanical cutting device.

3. The method of claim 1, wherein the cutting device is a milling tool.

4. The method of claim 1, wherein the cutting device is a grinding disc.

5. The method of claim 1, wherein the cutting device is a plasma burner torch.

6. The method of claim 1, wherein the cutting device is a laser beam cutter.

7. The method of claim 1, wherein the extracting and the removing are performed manually.

8. The method of claim 1, wherein the extracting and the removing are performed with help of a manipulating robot.

9. The method of claim 1, wherein the selecting and the recuperating various materials are performed manually.

10. The method of claim 1, wherein the selecting and the recuperating various materials are performed with help of one or more identifying and manipulating robots.

11. A method of recycling hermetically encapsulated alternative compressor units used in refrigerators of small and medium power rating, the method comprising:
    mounting a compressor unit on a rotatable plate, wherein an axis of the of the compressor unit is arranged to coincide with a rotation axis of the rotatable plate;
    rotating the rotatable plate with the compressor unit mounted thereon about the rotation axis of the rotatable plate;
    cutting the head portion of the envelope of the compressor unit with a cutting device while the compressor unit rotates and separation the head portion from a base portion of the envelope;
    draining a liquid contained in the compressor unit while the compressor unit remains mounted to the rotatable plate;
    recuperating the liquid contained in the compressor unit;
    after the cutting, extracting a motor and removing other elements from the compressor unit;
    transporting the removed elements via a perforated transporting belt; and
    selecting metals of the removed elements being transported via the perforated transporting belt.

* * * * *